United States Patent
Ellis

(10) Patent No.: US 10,703,578 B2
(45) Date of Patent: Jul. 7, 2020

(54) PACKAGING MACHINE FOR PACKAGING WITH STRETCH FILM

(71) Applicant: Bizerba SE & Co. KG, Balingen (DE)

(72) Inventor: Eugen Ellis, Rohrdorf (DE)

(73) Assignee: BIZERBA SE & CO. KG, Balingen (DE)

(*) Notice: Subject to any disclaimer, the term of this patent is extended or adjusted under 35 U.S.C. 154(b) by 0 days.

(21) Appl. No.: 16/691,629

(22) Filed: Nov. 22, 2019

(65) Prior Publication Data

US 2020/0165071 A1    May 28, 2020

(30) Foreign Application Priority Data

Nov. 27, 2018 (EP) ..................................... 18208721

(51) Int. Cl.
*B08B 1/02* (2006.01)
*B65G 45/16* (2006.01)
(Continued)

(52) U.S. Cl.
CPC .............. *B65G 45/16* (2013.01); *B08B 1/005* (2013.01); *B08B 1/02* (2013.01); *B65G 15/60* (2013.01);
(Continued)

(58) Field of Classification Search
CPC ........... B08B 1/02; B08B 1/005; B65G 15/60; B65G 45/16; B65G 15/62
(Continued)

(56) References Cited

U.S. PATENT DOCUMENTS 4,317,322 A * 3/1982 Lancaster ............. B65B 11/008
                                                          53/399
4,628,668 A * 12/1986 Wildmoser ............. B65B 9/026
                                                          53/399

(Continued)

FOREIGN PATENT DOCUMENTS

EP         0044820 A1      1/1982
EP         0284538 A1      9/1988
(Continued)

OTHER PUBLICATIONS

US 2019/0389607 A1, Kirsch et al., Dec. 26, 2019.*
US 2019/0389682 A1, Heller et al., Dec. 26, 2019.*
US 2020/0062436 A1, Kirsch et al., Feb. 27, 2020.*

*Primary Examiner* — Douglas A Hess
(74) *Attorney, Agent, or Firm* — Leydig, Voit & Mayer Ltd.

(57) ABSTRACT

A packaging machine for packaging products to be packaged using a stretchable film has a film transporter supplying the film. The film transporter has first and second belt conveyors that each have first and second transport belts, which are synchronously driven and arranged next to one another in a film transport direction. A belt conveyor is movable in a direction perpendicular to the film transport direction, and has a movable film guide to insert the film into the film transporter. The film guide has a guide plate for guiding the film. The guide plate has first and second recesses in an upper edge in the vertical direction facing the belt conveyors. The belt conveyors are to be inserted into a respective one of the recesses. The film transporter has cleaners for the belt conveyors.

14 Claims, 6 Drawing Sheets

(51) Int. Cl.
  *B08B 1/00* (2006.01)
  *B65G 15/60* (2006.01)
(52) U.S. Cl.
  CPC ...... *B65H 2404/14* (2013.01); *B65H 2553/61* (2013.01)
(58) Field of Classification Search
  USPC ............... 198/498, 499, 861.1; 226/170
  See application file for complete search history.

(56) References Cited

U.S. PATENT DOCUMENTS

| | | | | |
|---|---|---|---|---|
| 4,787,500 A * | 11/1988 | Holz | ............ | B65G 45/12 15/256.5 |
| 4,912,911 A * | 4/1990 | Down | ............ | B65B 11/04 53/211 |
| 5,463,841 A * | 11/1995 | Hayakawa | ...... | B65B 69/0033 53/381.2 |
| 5,528,881 A * | 6/1996 | Cappi | ............ | B65B 11/54 53/441 |
| 5,534,063 A * | 7/1996 | Maruyama | ...... | G03G 21/00 118/101 |
| 6,012,568 A * | 1/2000 | Kane | ............ | B65G 21/10 198/817 |
| 6,170,236 B1 * | 1/2001 | Whitby | ............ | B65B 11/54 53/441 |
| 6,289,652 B1 * | 9/2001 | Lancaster | ...... | B65B 11/008 53/176 |
| 6,688,458 B2 * | 2/2004 | Prentice | ...... | B65G 21/10 198/502.1 |
| 6,766,630 B2 * | 7/2004 | Rutten | ............ | B65B 69/0025 242/527 |
| 6,978,587 B2 * | 12/2005 | Drolet | ............ | B65B 5/022 53/556 |
| 7,076,930 B2 * | 7/2006 | Rimondi | ............ | B65B 9/073 53/433 |
| 7,343,722 B1 * | 3/2008 | Rutten | ............ | B65B 69/0033 242/615.3 |
| 7,866,457 B2 * | 1/2011 | Swinderman | ...... | B65G 45/12 198/497 |
| 8,132,666 B2 * | 3/2012 | McAlister | ...... | B65G 21/2072 198/836.1 |

FOREIGN PATENT DOCUMENTS

EP            3093244 A1    11/2016
WO    WO 2004000651 A1    12/2003

* cited by examiner ic # PACKAGING MACHINE FOR PACKAGING WITH STRETCH FILM

CROSS-REFERENCE TO PRIOR APPLICATIONS

Priority is claimed to European Patent Application No. EP 18 208 721.3, filed on Nov. 27, 2018, the entire disclosure of which is hereby incorporated by reference herein.

FIELD

The present invention relates to a packaging machine for packaging products to be packaged by means of a stretchable film.

BACKGROUND

EP 3 093 244 B1 discloses a packaging machine for packaging by means of films, in particular by means of stretch films. This packaging machine is designed to supply the stretch film to the product to be packaged by means of a film transport device having a first belt conveyor and a second belt conveyor.

SUMMARY

In an embodiment, the present invention provides a packaging machine for packaging products to be packaged using a stretchable film has a film transporter supplying film to a product to be packaged. The film transporter has belt conveyors having a first belt conveyor and a second belt conveyor for transporting the stretchable film. The belt conveyors each have a first transport belt and a second transport belt, which are synchronously driven and are arranged next to one another in a film transport direction predetermined by the film transporter. At least the second belt conveyor is movable in a direction perpendicular to the film transport direction, and has a movable film guide configured to insert the film into the film transporter. The film guide has a guide plate for guiding the film. The guide plate has a first recess and a second recess in an upper edge in the vertical direction facing the belt conveyors. The first belt conveyor is configured to be inserted into the first recess. The second belt conveyor is configured to be inserted into the second recess. The film transporter further has cleaners for the belt conveyors.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
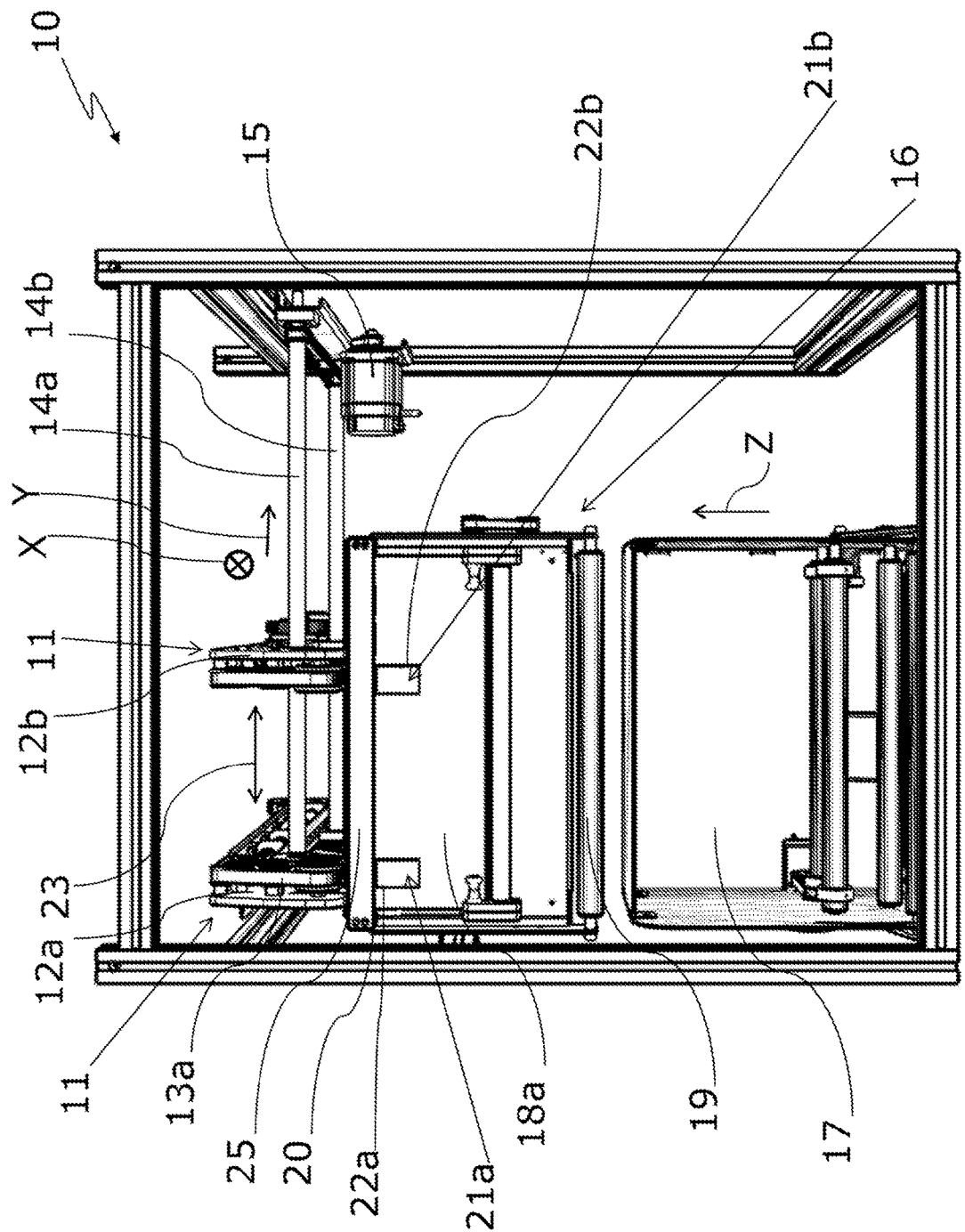
FIG. 1 an isometric front view of a packaging machine for packaging products to be packaged.

Packaging machines can operate with stretch film consisting of polyethylene (PE) or polyvinyl chloride (PVC). The film is very thin, preferably between 2 µm and 30 µm, more preferably between 12 µm and 16 µm thick. The transport belts of the belt conveyors are driven toothed belts made of fabric which are rough at their transport surfaces and have a certain surface tension. This ensures that the film can be held by friction between two transport belts pressed against one another and transported by movement of the transport belts. Over time, however, the adhesiveness of the transport belts decreases and film transport becomes increasingly fault-prone.

Embodiments of the present invention prevent or minimize this effect and to reduce the fault-proneness of a packaging machine of the type mentioned at the outset.

The present application relates to a packaging machine for packaging products to be packaged by means of a stretchable film. The packaging machine comprises a film transport device for supplying film to a product to be packaged. The film transport device has a first and a second belt conveyor for transporting the film. The belt conveyors each comprise a first and a second transport belt, which are synchronously driven and arranged next to one another in a film transport direction predetermined by the film transport device. At least the second belt conveyor is movable in a direction perpendicular to the film transport direction. The packaging machine comprises a movable film guiding element by means of which the film can be inserted into the film transport device. The film guiding element comprises a guide plate for guiding the film. In a vertically upper edge facing the belt conveyors, the guide plate has a first recess and a second recess. The first belt conveyor is insertable into the first recess. The second belt conveyor is insertable into the second recess. That is to say, for film transfer, the first belt conveyor with its front part is partially located in the first recess. For film transfer, the second belt conveyor with its front part is partially located in the second recess. In order to achieve this mutual position, the guide plate is moved vertically toward the first and the second belt conveyor. The first and the second belt conveyor are not moved in the vertical direction. The film transport device also has cleaning devices for the belt conveyors. In one embodiment, the film transport device comprises a first cleaning device for the first belt conveyor and a second cleaning device for the second belt conveyor. In one embodiment, each belt conveyor comprises a first cleaning device for the first transport belt and a second cleaning device for the second transport belt.

During the packaging process, the stretch film is held by friction between the first transport belt and the second transport belt of a belt conveyor. As a result of the synchronous movement of the transport belts, the stretch film is moved along the film transport direction. In the process, the transport belts hold the film at its lateral edge regions. The stretch film is pulled apart by the stretching process of the film, which is caused by the movement of at least one belt conveyor in the direction perpendicular to the film transport direction. That is to say, the belts must clamp the stretch film between one another to such an extent that the stretch film does not slip from between the belts even if the stretch film is subjected to mechanical stress by the stretching process. This process results in film abrasion. The particles forming the abrasion debris remain adhered to the transport belts. In other words, particles of the stretch film remain attached to the transport belt as a result of repeated packaging with the packaging machine. In addition, when the film is transferred from the film guiding element into the film transport device, small damage can occur at the upper edge of the film, which causes small film parts to be torn off the film. These small film parts also adhere to the transport belts. During prolonged operation of the packaging machine, the film abrasion debris and small film parts result in the transport belts no longer applying sufficient friction to hold the film during the stretching process. The result is the stretch film slipping from the transport belts when a belt conveyor is moved in the direction perpendicular to the film transport direction. Furthermore, during synchronous movement of the transport belts of the belt conveyors, the stretch film can develop slippage in at least one belt conveyor so that the stretch film creates congestion and forms folds at least in one belt conveyor. Both effects can lead to a malfunction of the packaging machine individually and, in particular, when they occur simultaneously.

The transport belts also have a rough surface. As a result of repeatedly rubbing the transport belts together during synchronous movement, this surface, which is caused by the fabric structure of the transport belts, becomes smoother over time. This effect is undesirable since it reduces the friction between transport belt and stretch film.

The cleaning device, which skims over the transport belts during operation, wipes the abrasion debris and the small film parts off the transport belts. At the same time, the fabric structure on the transport belt is roughened again. This is to be understood as meaning that the cleaning devices counteract smoothing of the transport belts by skimming over the transport belts. This is not to be understood as meaning that the cleaning devices, like grinding paper, remove material from the transport belts. On its surface, a transport belt consists of fibers which are pressed smooth by the transport process. The cleaning device re-erects these fibers so that the rough surface of the transport belt is maintained or restored. On account of all these effects, the cleaning device maintains the friction between film and transport belts and ensures error-free functioning of the packaging machine without separate manual maintenance of the transport belts.

In one embodiment, the cleaning devices are mounted at the end of a film transport path in the film transport direction.

In one embodiment, a cleaning device comprises a cleaning element that is in direct contact with the surface of the transport belt that contacts the stretchable film during film transport. The cleaning element skims over the side of the transport belt that has direct contact with the stretch film.

In one embodiment, the cleaning element is mounted in the region of a deflection roller of the belt conveyor. The cleaning element touches the surface of the transport belt in the region of the deflection roller. In the region of the deflection roller, the side of the transport belt that is in contact with the stretch film forms an outer radius. If the dirty side of the transport belt is bent outward and is stably guided over the deflection roller, the greatest cleaning effect takes place. The cleaning element can create the greatest friction. The bending of the transport belt makes it particularly easy to remove the film abrasion debris and the film particles.

In one embodiment, the cleaning element is designed as a scraper. The scraper has a curved shape. The direction of curvature of the scraper corresponds to the direction of curvature of the deflection roller. In other words, the curvature of the scraper and the curvature of the deflection roller extend in parallel, although the scraper and deflection roller are not arranged equidistantly. In one embodiment, the radius of curvature of the outer edge of the scraper is less than the radius of the deflection roller. In one embodiment, the scraper is concave.

In one embodiment, the cleaning element is spring-loaded. The spring presses the cleaning element against the transport belt and/or against the deflection roller.

In one embodiment, the cleaning element is connected to the belt conveyor via an axis of rotation. A spring, in particular a spiral spring, moves or pushes the cleaning element on the axis of rotation in the direction of a spring force so that the cleaning element is pressed against the transport belt and/or against the deflection roller.

In one embodiment, the cleaning element is arranged with respect to the transport belt such that the holder of the cleaning element on the belt conveyor in the transport direction of the transport belt follows the contact point between the transport belt and the cleaning element. That is to say, at its contact point with the transport belt, the scraper presses against the movement of the transport belt and does not pull against the movement of the transport belt.

In one embodiment, the longitudinal extent of the cleaning element substantially extends counter to the tangent of the transport belt in the transport direction at the contact point between cleaning element and transport belt. Care must be taken that the tangent of the transport belt corresponds to the tangent of the deflection roller which is applied at the contact point of the transport belt and the deflection roller with the scraper. However, this tangent and the longitudinal extent of the cleaning element are not the same. They merely extend in the same direction, i.e. are substantially the same. However, they have an opposite orientation. Substantially the same in this context is to include an angular deviation of less than 20 degrees. The longitudinal direction of the scraper is not in the radial or approximately radial direction of the deflection roller.

In one embodiment, the cleaning element has an acute angle of preferably less than 15° at the point designed for contact with the transport belt and/or the deflection roller. This results in effective scraping off of film abrasion debris and roughening of the transport belt.

In one embodiment, the cleaning element has a mark indicating a wear limit of the cleaning element. If the cleaning element is worn down by the operation of the packaging machine to such an extent that the cleaning element itself is eroded down to the mark, it must be replaced. The cleaning element is a wear part.

In one embodiment, the deflection roller comprises a contact sensor. The contact sensor sends an interference signal if the cleaning element does not touch the contact sensor and/or an operating signal if the cleaning element touches the contact sensor.

Some embodiments of the invention are shown by way of example in the drawings and are described in the following.

FIG. 1 shows an isometric front view of a packaging machine 10 according to an embodiment of the invention for packaging products to be packaged (by means of a stretchable film. The packaging machine has a film transport device (film transporter) 11 for supplying film to a product to be packaged. A first belt conveyor 12a and a second belt conveyor 12b for transporting the film form components of the film transport device 11. The first and the second belt conveyor 12a, 12b each have a first and a second transport belt 13a, 13b (see FIG. 2). The transport belts 13a, 13b are synchronously driven and arranged adjacent to each other in a predetermined film transport direction X, predetermined by the film transport device 11 (in FIG. 1 into the paper level, represented by a cross). The second belt conveyor 12b is movable in a direction Y perpendicular to the film transport direction X by spindles 14a, 14b and a spindle motor 15. With a film guiding element (film guide) 16 of the packaging machine 10 movable in the vertical direction Z, the film can be inserted into the film transport device 11 from a film dispensing device 17. The term "vertical" relates in particular to the direction parallel to the gravitational force. The film dispensing device 17 is formed below the film guiding element 16, and the film transport device 11 is formed above the film guiding element 16. The film guiding element 16 has a first guide plate 18a and a second guide plate 18b (see FIG. 2). The guide plates 18a, 18b are vertically aligned. Above a deflection roller 19 of the film guiding element 16 at the lower end of the film guiding element 16, the film is insertable between the guide plates 18a, 18b.

A first recess 21a and a second recess 21b are formed in an upper edge 20 in the vertical direction Z of the guide plate 18a facing the belt conveyors 12a, 12b. The film guiding element 16 is movable in the vertical direction Z. As a result, the guide plate 18a can be moved to the height of the belt conveyors. The border 22a of the first recess surrounds the first belt conveyor 12a. The border 22b of the second recess 21b surrounds the second belt conveyor 12b. The distance 23 between the two belt conveyors 12a, 12b thus corresponds to the distance between the two recesses 21a, 21b during the film transfer. As a result, the belt conveyors 12a, 12b are inserted into the recesses 21a, 21b.

A film cutting device 25 is arranged in the vertical direction below the belt conveyors. The film is transported by the belt conveyors 12a, 12b until the film has a sufficient length, as measured from the film cutting device 25, for the desired packaging process. The film guiding element 16 with the guide plates 18a, 18b is then moved downward in the vertical direction toward the film dispensing device 17. The guide plates 18a, 18b of the film guiding element 16 thus exit the film cutting device 25. The film cutting device 25 then cuts through the film. The cut-off film is then further transported by the belt conveyors 12a, 12b until the cut portion of the film is arranged in a horizontal orientation in a position vertically above a lifting table. The lifting table will later move the product to be packaged in a vertical direction. Thus, the cut portion of film is arranged vertically above the product to be packaged between the belt conveyors 12a, 12b. The film is stretched by a movement of the belt conveyor 12b in the direction Y perpendicular to the film transport direction X. A product to be packaged, for example a tray, can be fed by a packaging product transport device to the film between the transport belts 13a, 13b. Such a packaging product transport device may comprise a supply transport belt and a lifting table, as described in the above-cited EP 3 093 244 B1. When the product to be packaged is fed to the film by a lifting process, the film wraps around the product to be packaged. The film can be wrapped around the product to be packaged by folding claws. The product to be packaged can then be pushed by a pusher onto a sealing plate on which the film is welded and lastly can be transported away by a transport belt, as outlined in EP 3 093 244 B1.

Figure 2:
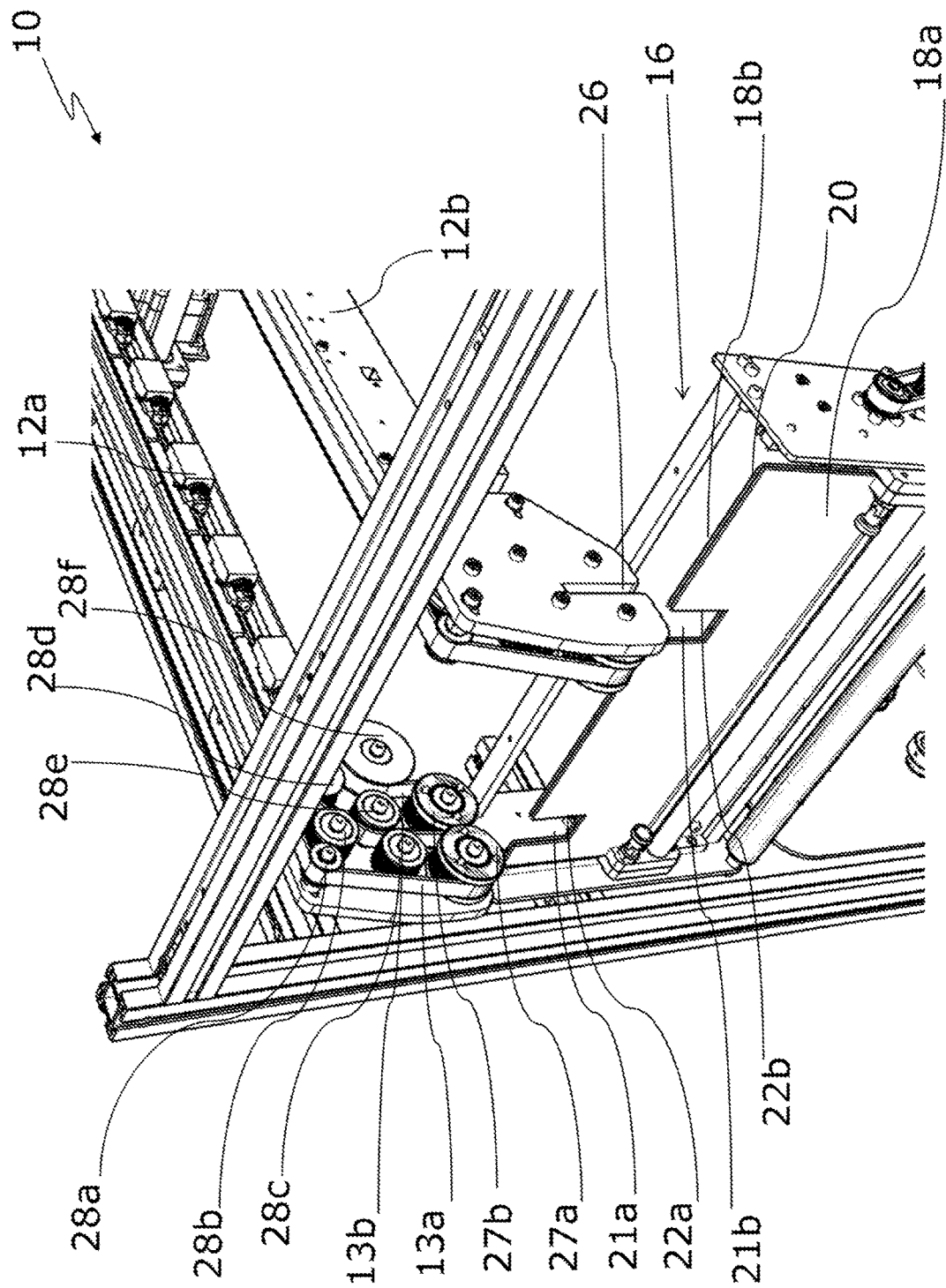
FIG. 2 an isometric front view of a section of the packaging machine with belt conveyors and a film guiding element obliquely from above.

FIG. 2 shows an isometric front view of a section of the packaging machine 10 with the belt conveyors 12a, 12b and of the film guiding element 16 obliquely from above. For greater clarity, the film cutting device 25 is not shown in FIG. 2. In particular, the first and the second guide plate 18a, 18b of the film guiding element 16 between which the film is transported are shown. The belt conveyors 12a, 12b have recesses 26 for the upper edge 20 of the guide plates 18a, 18b. In the state where the belt conveyors 12a, 12b are inserted into the recesses 21a, 21b, the borders 22a, 22b of the recesses 21a, 21b surround the belt conveyors 12a, 12b. The transport belts 13a, 13b are guided in each case by a deflection roller 27a, 27b arranged at the end in the transport belts 13a, 13b. A first, second, third, fourth, fifth, and sixth guide roller 28a, 28b, 28c, 28d, 28e, 28f for guiding the transport belt 13a, 13b are positioned downstream of the deflection rollers 27a, 27b in relation to transport direction X.

Figure 3:
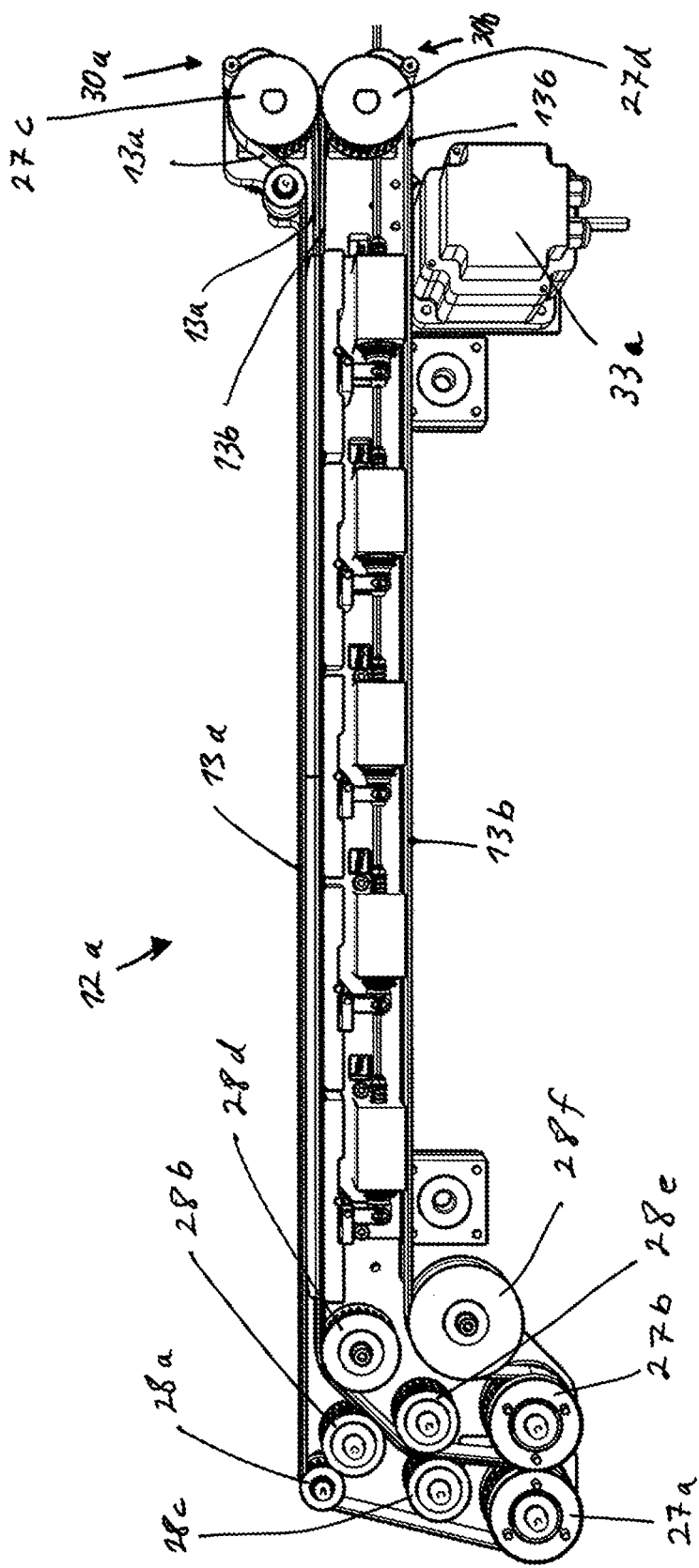
FIG. 3 a side view of a belt conveyor.

FIG. 3 shows a side view of the first belt conveyor 12a. The transport belts 13a, 13b are guided in each case by a deflection roller 27a, 27b arranged at the end in the transport belts 13a, 13b. A first, second, third, fourth, fifth, and sixth guide roller 28a, 28b, 28c, 28d, 28e, 28f for guiding the transport belt 13a, 13b are positioned downstream of the deflection rollers 27a, 27b in relation to transport direction X. On this side, the film is transferred via the movable film guiding element 16 into the gap between the transport belts. The transport belts 13a, 13b are deflected in the film transport direction X at the end of the first belt conveyor 12a via deflection rollers 27c, 27d. A drive motor 33a synchronously drives the deflection rollers 27c, 27d via a gearing mechanism (not shown). The deflection rollers 27c, 27d drive the transport belts 13a, 13b. The transport belts 13a, 13b are designed as toothed belts, wherein the teeth of the transport belts 13a, 13b engage in gears which are integrated in the deflection rollers 27c, 27d. The transport belts 13a, 13b consist of a flexible fabric, the surface of which coming into contact with the film is rough. The surface consists of fibers which protrude slightly from the strand of the transport belt 13a, 13b. In the region of the deflection rollers 27c, 27d in the film transport direction X at the end of the first belt conveyor 12a are located cleaning devices (cleaners) 30a, 30b for the transport belts 13a, 13b. The second belt conveyor 12b is symmetrically constructed with respect to the first belt conveyor 12a.

Figure 4:
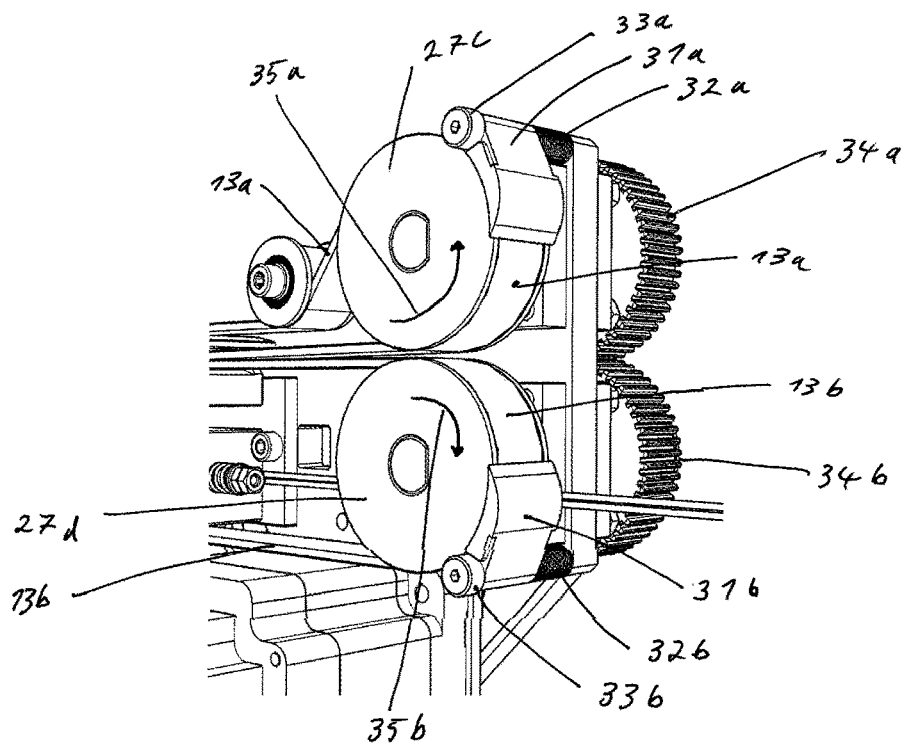
FIG. 4 an isometric view of the rear region of a belt conveyor.
Figure 5:
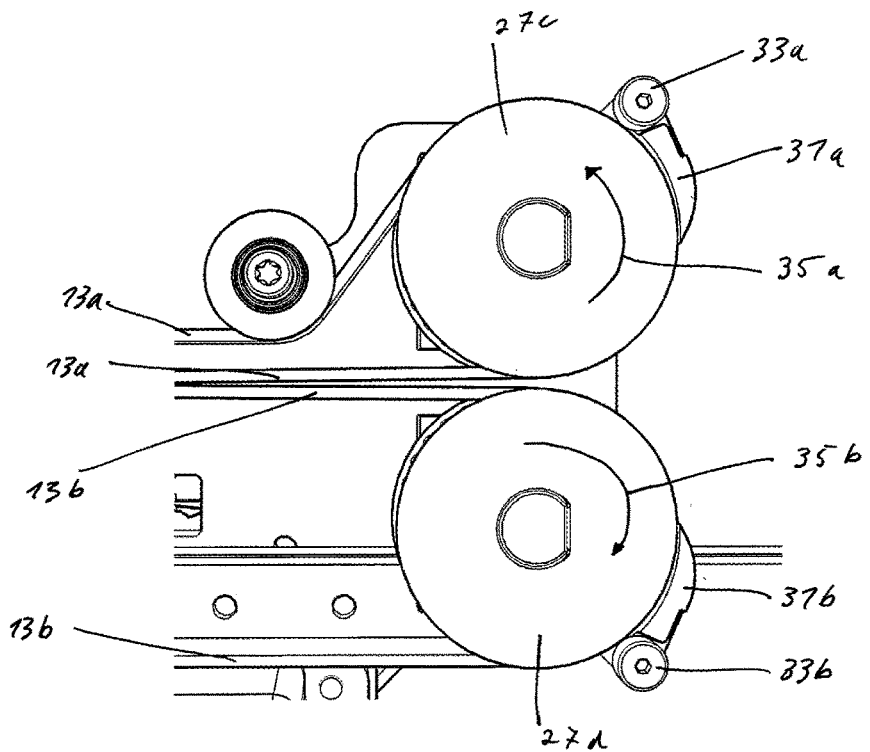
FIG. 5 an isometric side view of the rear region of a belt conveyor.
Figure 6:
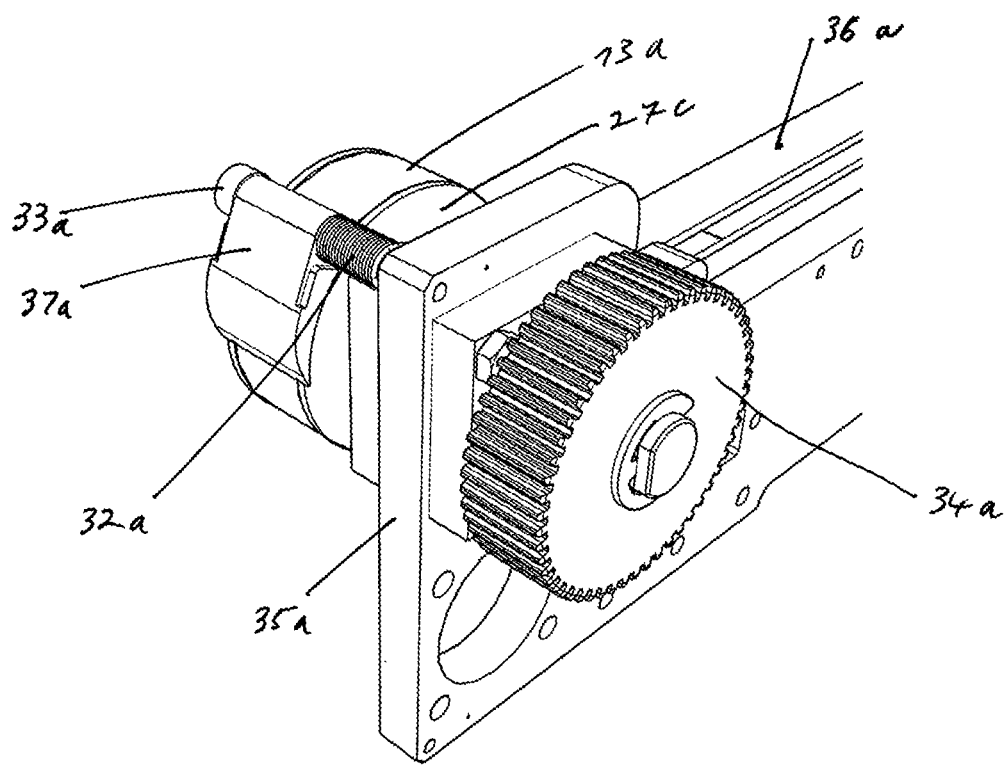
FIG. 6 an isometric view of a cleaning device for a transport belt.
Figure 7:
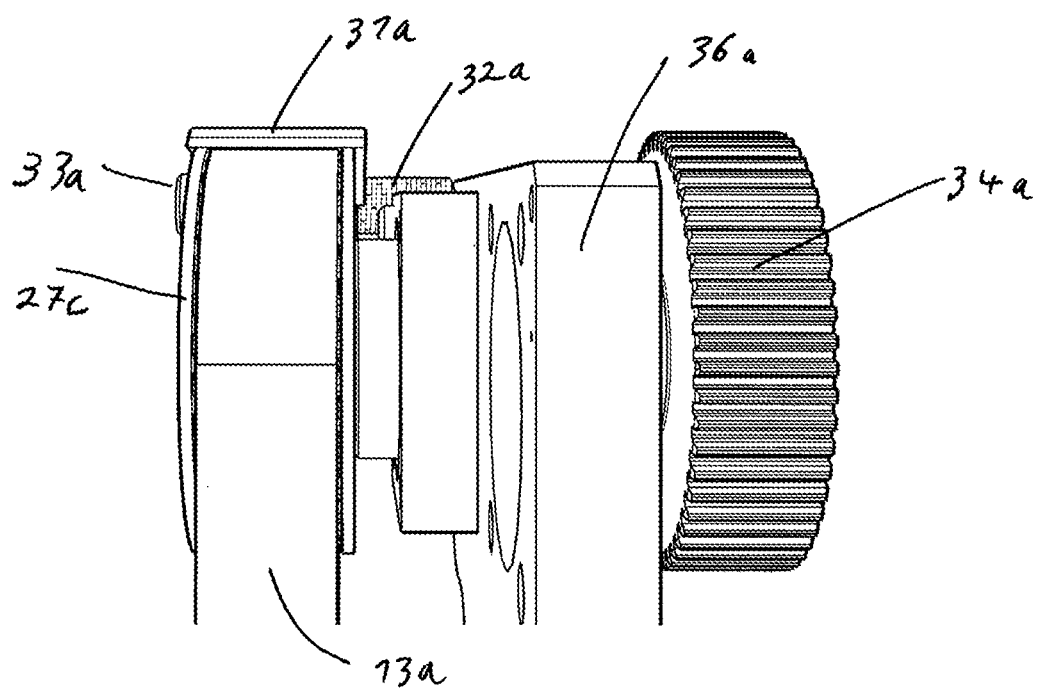
FIG. 7 an isometric front view of a cleaning device for a transport belt.

FIGS. 4 and 5 show an isometric front view and an isometric side view of the end region of the first belt conveyor 12a in the film transport direction X. FIG. 6 shows an isometric view of the deflection roller 27c and a cleaning device 30a for the first transport belt 13a. FIG. 7 shows a side view in the tangential direction of the first transport belt 13a on the deflection roller 27c. The deflection rollers 27c, 27d deflect the transport belts 13a, 13b. The deflection rollers are driven by a motor 33a via the gears 34a, 34b. The first deflection roller 27c guides the first transport belt 13a and is driven by the first gear 34a. The second deflection roller 27d guides the second transport belt 13b and is driven by the second gear 34b. The two deflection rollers 27c, 27d rotate synchronously in opposite rotational directions 35a, 35b. The two deflection rollers thus drive the transport belts 13a, 13b synchronously. The cleaning devices 30a, 30b consist of a scraper 31a, 31b which is rotatably connected to the frame 36a of the first belt conveyor 12a via a bolt 33a, 33b. A spring 32a, 32b presses the scraper 31a, 31b in the rotational direction around the bolt 33a, 33b against the edge of the deflection roller 27c, 27d. The bolt 33a, 33b is, for example, a screw. The scraper is elongate in shape and has a curvature. The scraper is tapered in its region in which it touches the deflection roller 27c, 27d, and touches the transport belt 13a, 13b and the edges of the deflection roller 27c, 27d between which the transport belt 13a, 13b extends. The edges of the deflection roller 27c, 27d and of the transport belts 13a, 13b are flush in their radial height so that the edge of the scraper 31a rests on both the transport belt 13a, 13b and on the edges of the deflection roller 27c, 27d (FIG. 7).

Figure 8:
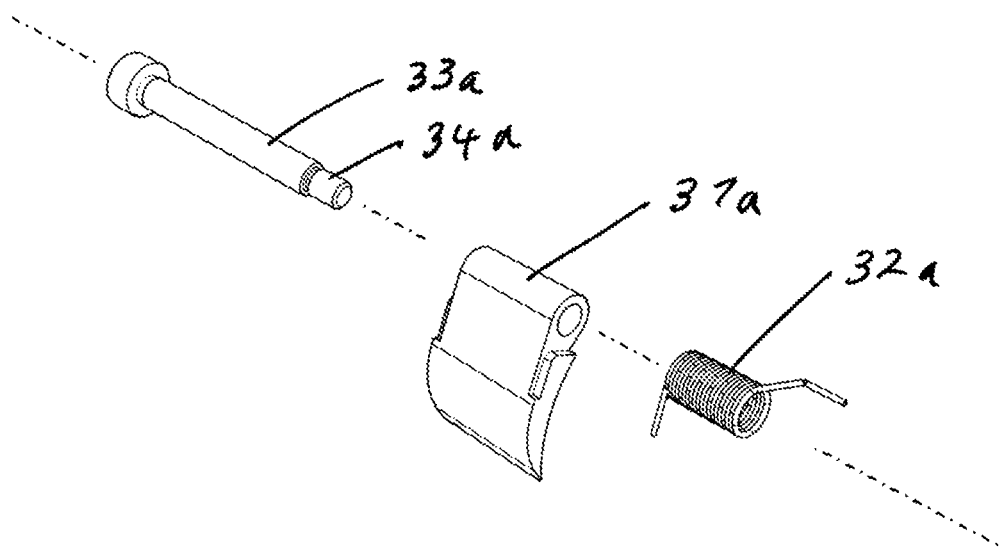
FIG. 8 an exploded view of a cleaning device.

FIG. 8 shows an exploded view of a cleaning device 30a. The cleaning device 30a consists of a scraper 31a fitted onto a screw 33a. The screw 33a forms an axis of rotation for the scraper 33a. A spring 32a exerts a force on the scraper 31a and pushes it in the direction of the deflection roller 27c. The spring 32a is designed as a spiral spring and is likewise fitted onto the screw. One end of the spring 32a exerts the force on a spring receptacle on the scraper. The other end of the spring 32a is supported on the frame 36a of the belt conveyor 12a. At its end, the screw 33a has a thread 34a with which the cleaning device 30a is screwed to the frame 36a of the belt conveyor 12a.

Figure 9:
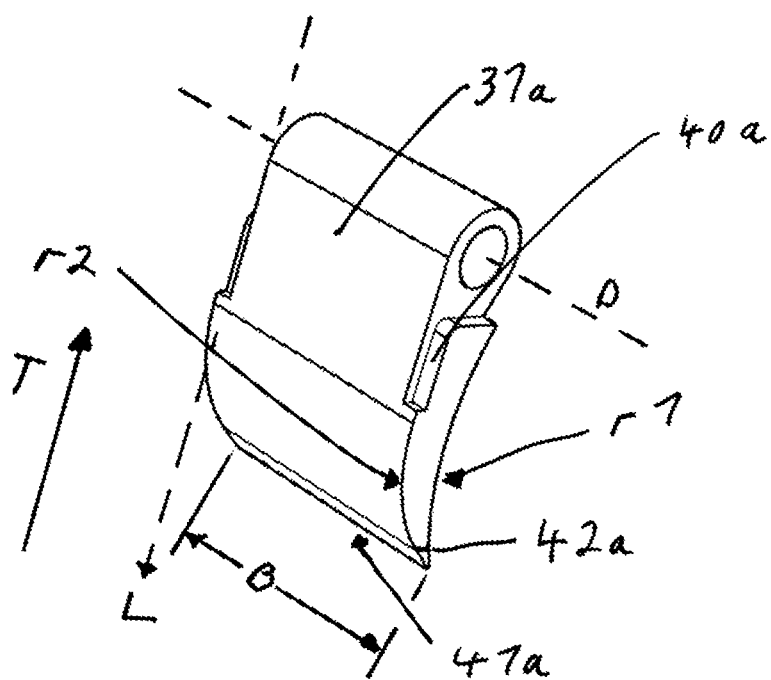
FIG. 9 an isometric view of a cleaning element designed as a scraper.

FIG. 9 shows the scraper 31a. The scraper 31a is rotatably mounted on a screw 33a (bolt) and rotates about the axis of rotation D. In this case, the rotational direction of the scraper 31a is limited by the deflection roller 27c and the transport belt 13a, which serve as stops. The scraper 31a comprises a spring receptacle 40 in which the spiral spring 32a engages. The scraper has a contact region 41a which is formed as a smooth edge and with which the scraper 31a touches the transport belt 13a and the edges of the deflection roller 27c. The scraper 31a is elongate and has a longitudinal direction L substantially formed by the direction of the scraper 31a. As shown in FIGS. 4 to 7, the scraper 31a engages in the deflection roller 27c in such a way that the tangent of the deflection roller and thus the tangent of the transport belt 13a at the point at which the scraper touches the deflection roller 27c and the transport belt 13a is substantially parallel to the longitudinal direction L of the scraper 31a. The scraper is arranged such that the tangent T of the transport belt 13a in the direction of movement of the transport belt 13a is opposite to the longitudinal direction L of the scraper.

The scraper 31a has a width b. Furthermore, the scraper 31a in its front half, which is closer to the deflection roller 27c, has an inner radius r1 which substantially corresponds to the radius of the deflection roller 27c. In this region, the scraper has an outer radius r2 which is smaller than the radius of the deflection roller 27c. Thus, r2<r1, which defines the essential shape of the front half of the scraper 31a. The rear half of the scraper 31a, in which its axis of rotation is located, is shaped to be substantially straight. The scraper 31a has a mark 42a in the contact region. The contact region 41a of the scraper wears down as a result of constant friction with the rough transport belt 13a so that signs of wear occur. If the scraper 31a is worn down to the mark 42a, the scraper 31a must be exchanged. The second cleaning device 30b for the second transport belt 13b is designed to correspond to the first cleaning device 30a for the first transport belt 13a.

The front edge of the scraper 31a, which constitutes the contact region 41a of the scraper 31a, has an acute angle less than 15°. The movement of the transport belt 13a brushes the transport belt 13a in the moving direction against this front edge. The spring 32a presses the front edge of the scraper 31a in the direction of the transport belt 13a. As a result, the scraper 31a roughens the transport belt 13a and wipes the film abrasion debris and small film parts off. By moving the transport belt 13a toward the scraper 31a, the friction between the scraper 31a and the transport belt 13a results in the scraper 31a being pulled in the direction of the transport belt 13a. This advantage could not be realized if the transport belt 13a were to move in the reverse direction and pull at the front edge of the scraper 31a.

The shape of the scraper 31a, which serves as a cleaning element, with the inner radius r1 substantially corresponding to the radius of the deflection roller 27c and the outer radius r2, which is smaller than the inner radius r1, supports this effect.

The functions of various elements shown in the drawings, including the functional blocks, may be realized by dedicated hardware or by generic hardware capable of executing software in connection with the corresponding software. If the functions are provided by a processor, they may be provided by a single dedicated processor, single shared processor, or multiple generic processors, which in turn may be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A packaging machine for packaging products to be packaged using a stretchable film, the packaging machine comprising:
   a film transporter configured to supply film to a product to be packaged, the film transporter comprising belt conveyors comprising a first belt conveyor and a second belt conveyor for transporting the stretchable film,
   wherein the belt conveyors each comprise a first transport belt and a second transport belt, which are synchronously driven and are arranged next to one another in a film transport direction predetermined by the film transporter, wherein at least the second belt conveyor is movable in a direction perpendicular to the film transport direction, and has a movable film guide configured to insert the film into the film transporter, wherein the film guide comprises a guide plate for guiding the film, wherein the guide plate has a first recess and a second recess in an upper edge in the vertical direction facing the belt conveyors, wherein the first belt conveyor is configured to be inserted into the first recess, wherein the second belt conveyor is configured to be inserted into the second recess, wherein the film transporter further comprises cleaners for the belt conveyors.

2. The packaging machine according to claim 1, wherein the cleaners comprise a first cleaner for the first belt conveyor and a second cleaner for the second belt conveyor.

3. The packaging machine according to claim 1, wherein each of the belt conveyors comprises a first cleaner of the cleaners for the first transport belt and a second cleaner of the cleaners for the second transport belt.

4. The packaging machine according to claim 1, wherein the cleaners are mounted at an end of a film transport path in the film transport direction.

5. The packaging machine according to claim 1, wherein a cleaner of the cleaners comprises a cleaning element which is in direct contact with a surface of the first transport belt or the second transport belt which contacts the stretchable film during film transport.

6. The packaging machine according to claim 5, wherein the cleaning element touches the surface of the first transport belt or the second transport belt in the region of a deflection roller.

7. The packaging machine according to claim 6, wherein the cleaning element is a scraper which has a curved shape and the direction of its curvature corresponds to the direction of the curvature of the deflection roller, wherein the radius of the curvature of an outer edge of the scraper is smaller than the radius of the deflection roller.

8. The packaging machine according to claim 6, wherein the cleaning element is spring-loaded against the first transport belt or the second transport belt and/or against the deflection roller.

9. The packaging machine according to claim 8, wherein the cleaning element is connected to one of the belt conveyors via an axis of rotation and a spring is configured to move the cleaning element on the axis of rotation in the direction of a spring force so that the cleaning element is pressed against the first transport belt or the second transport belt and/or against the deflection roller.

10. The packaging machine according to claim 1, wherein a cleaning element of the cleaners is arranged with respect to the first transport belt or the second transport belt in such a way that a holder of the cleaning element on one of the belt conveyors follows a contact point between the first transport belt or the second transport belt and the cleaning element in the transport direction of the first transport belt or the second transport belt.

11. The packaging machine according to claim 1, wherein the direction of a longitudinal extent of a cleaning element of the cleaners substantially extends counter to a tangent of the first transport belt or the second transport belt in the transport direction at a contact point between the cleaning element and first transport belt or the second transport belt.

12. The packaging machine according to claim 1, wherein a cleaning element of the cleaners has an acute angle of less than 15° at a point designed for contact with the first transport belt or the second transport belt and/or a deflection roller.

13. The packaging machine according to claim 1, wherein a cleaning element of the cleaners has a mark which indicates a wear limit of the cleaning element.

14. The packaging machine according to claim 1, wherein a deflection roller has a contact sensor, wherein the contact sensor sends an interference signal based on the cleaning element not touching the contact sensor and/or sends an operating signal based on the cleaning element touching the contact sensor.

* * * * *